United States Patent [19]
Rodrigue

[11] Patent Number: 5,692,545
[45] Date of Patent: Dec. 2, 1997

[54] FIBER OPTIC CABLE DUCT

[76] Inventor: Wayne Rodrigue, 2819 Colony Dr., Sugar Land, Tex. 77479

[21] Appl. No.: 567,262

[22] Filed: Dec. 5, 1995

[51] Int. Cl.$^6$ .............................. F16L 11/11; G02B 6/44
[52] U.S. Cl. .................... 138/115; 138/117; 138/108; 385/112
[58] Field of Search ................... 138/115, 111–114, 138/116, 121, 122, 117, 118, 177, DIG. 9, 108; 385/112, 113, 101, 109

[56] References Cited

U.S. PATENT DOCUMENTS

| | | | |
|---|---|---|---|
| 2,340,926 | 2/1944 | Bradley | 138/115 X |
| 2,624,366 | 1/1953 | Pugh | 138/115 |
| 3,872,894 | 3/1975 | Streit | 138/117 X |
| 4,003,408 | 1/1977 | Turner | 138/118 |
| 4,032,501 | 6/1977 | Schulz | 260/33.6 AQ |
| 4,096,887 | 6/1978 | Streit | 138/117 |
| 4,110,420 | 8/1978 | Turner | 264/41 |
| 4,168,799 | 9/1979 | Turner | 138/118 X |
| 4,230,395 | 10/1980 | Dean et al. | 385/112 |
| 4,343,844 | 8/1982 | Thayer et al. | 138/115 X |
| 4,496,823 | 1/1985 | Mann | 138/115 X |
| 4,786,137 | 11/1988 | Cornelison et al. | 385/112 |
| 4,932,746 | 6/1990 | Calzolari et al. | 385/112 |
| 5,027,864 | 7/1991 | Conti et al. | 138/177 |
| 5,046,815 | 9/1991 | Cain et al. | 385/112 |
| 5,247,599 | 9/1993 | Vyas et al. | 385/113 |
| 5,343,549 | 8/1994 | Nave et al. | 385/103 |
| 5,462,092 | 10/1995 | Franz et al. | 138/177 |

FOREIGN PATENT DOCUMENTS 3823  2/1901  United Kingdom .................. 138/115

OTHER PUBLICATIONS

European Patent Application 160-498 Valenzano Apr. 1985.

Primary Examiner—Patrick Brinson
Attorney, Agent, or Firm—Warner J. Delaune

[57] ABSTRACT

A cable duct for protecting communication cable is provided, comprising an elongated body portion having a first end and a second end, the body portion further including a longitudinal axis extending between the first end and the second end; and at least two passageways formed completely through the body portion and extending substantially parallel to the longitudinal axis, each of the passageways having a cross sectional area sufficient to loosely contain at least one communication cable. The cable duct is constructed from a combination of materials including plastic and crumb rubber, preferably in a 1:1 composition, and includes a plurality of external ridges formed perpendicular to the longitudinal axis. The body portion further includes end connectors which are removably attachable to the first end and/or second end for connecting the cable duct to a second cable duct. The cable duct can be manufactured with any number of passageways, and with the aforementioned composition of materials, the cable duct can thus be extruded to lengths of at least one kilometer for ease of transportation and installation.

6 Claims, 3 Drawing Sheets

FIBER OPTIC CABLE DUCT

BACKGROUND OF THE INVENTION

I. Field of the Invention

This invention relates generally to the construction and use of ducts for containing communication cables, and, more particularly, to the construction and use of such ducts in connection with the installation and maintenance of fiber optic cables.

II. Description of the Prior Art

In the communications industry, the proper design and installation of fiber optic cables is critical to maintaining the integrity of the information carried by such cables. Due to the delicate nature of the fibers themselves, there is a need to protect the fibers from external sources of stress, such as temperature, pressure and contact with contaminating substances. As a result, most of the innovation in this industry has been directed to devising certain combinations of coverings to surround the fibers. Therefore, a brief discussion of fiber optic cable design follows.

Many fiber optic cables comprise a plurality of light-guiding glass fibers which are surrounded by a solid material, such as a fluorocarbon material, to act as an insulator and as a protective sheath. In other cases, the fibers are surrounded by a filling compound, such as a high molecular weight hydrocarbon-based oil or petroleum jelly. The filling compound holds the bundle together, but also allows for relative sliding between fibers during flexion and easy replacement of particular fibers which may be defective. Whether the fibers are encased within the filling compound or within a more solid material, the entire bundle is typically surrounded by another tube of strong, substantially non-extensible material, such as polycarbonate. These individual fiber optic assemblies are sometimes referred to as "units", and a number of units may be further bundled to form more complex cables. Examples of such cables are shown in U.S. Pat. No. 5,343,549 to Navé, et al., U.S. Pat. No. 4,786,137 to Cornelison, et at., and U.S. Pat. No. 5,247,599 to Vyas, et al.

Rather than using petroleum jelly or a solid material to encase the fiber optic wave guides, other cable designs simply allow the fibers to be loosely contained within a passageway or tube within a larger tubular structure. Examples of these types of cables are shown in U.S. Pat. No. 4,230,395 to Dean, et al., U.S. Pat. No. 4,932,746 to Calzolari, et al., and U.S. Pat. No. 5,046,815 to Cain, et al.

Perhaps because so much effort has been spent in the design of the fiber optic cables themselves, the devices and methods available for actual installation of these cables have not seen substantial innovation. A current method of installing fiber optic cables of the type discussed above is disclosed in U.S. Pat. No. 5,027,864. That reference involves the use of a hollow outer duct, typically constructed of polyvinylchloride (PVC) in forty foot lengths, which provides the first level of protection from the elements underground. This outer duct acts as a conduit for the passage of a number of smaller tubes, or "inner ducts". Each of these inner ducts has a number of external longitudinally extending ribs, and each inner duct may contain a single fiber optic cable or a plurality of such cables. The method of installing the cables first requires the introduction of the inner ducts through the outer duct by pulling the inner ducts from a spool located on the surface. From an underground work area, a gripper is attached to one end of each inner duct, after which the inner ducts are drawn through the outer duct until they reside completely within the outer duct. Once the inner ducts are in place, the fiber optic cables are then drawn through each of the inner ducts by a pull string blown through each of the inner ducts. The resulting assembly, therefore, comprises a single fiber optic cable or a plurality of fiber optic cables within each of several inner ducts, with the inner ducts being surrounded by the protective outer duct. The ribbed design of the inner ducts is said to prevent "spiraling" of the inner ducts and the cables, while the overall design of the apparatus purports to facilitate the installation and removal of cables for maintenance and repair.

While the above described method of installation and housing of fiber optic cables does provide a certain level of convenience for maintenance and construction workers, as well as protection for the cables themselves, several deficiencies are apparent. First, the requirement of the inner ducts imposes a substantial increase in installation and repair costs, in terms of materials as well as labor. Second, the material used for fabrication of the ducts, i.e. PVC, does not afford the flexibility for use with spools in lengths greater than forty feet. Thus, the labor costs in connecting segments of outer duct, inner ducts, and fiber optic cables every forty feet adds a tremendous cost element to the overall project budget. Furthermore, each outer duct and inner duct connection site adds a point of structural weakness to the series of segments, as well as a site of possible contaminant infiltration from underground sources. Moreover, the data transmission integrity of the actual cables may be adversely affected by an excessive number of connections. Additionally, the exclusive use of PVC as the construction material in the outer duct does not impart sufficient degradation-resistant properties to the outer duct in harsh underground environments. Finally, there is evidence that degradation of PVC produces a gas which can harm the actual optical fibers.

What is needed, therefore, is an apparatus for containing fiber optic cables which overcomes the above noted deficiencies by: (1) eliminating the inner ducts altogether, while maintaining the expandability advantages of the prior art; (2) using construction materials which allow extrusion of a duct to much greater lengths than the prior art, thus allowing installation of such ducts from spools; (3) using construction materials which afford higher degradation-resistant properties to such ducts; and (4) minimizing the number of connections required between segments of the duct and the fiber optic cables to maximize the structural strength and other protective attributes of the duct and increase the data transmission integrity of the cables themselves.

SUMMARY OF THE INVENTION

Therefore, it is an object of this invention to provide a fiber optic cable housing which enables quicker installation of fiber optic cables, thus reducing labor and material costs substantially over the prior art.

It is another object of this invention to provide a fiber optic cable housing which is structurally sound and highly resistant to contaminating chemicals.

It is still another object of this invention to provide a fiber optic cable housing which is more flexible and which may be extruded to great lengths for spool delivery.

It is a further object of this invention to provide a fiber optic cable housing which reduces the number of connections required between the duct segments and the fiber optic cables themselves.

It is yet another object of this invention to provide a fiber optic cable housing which is highly expandable for future installation of communication cables.

It is another object of this invention to provide a fiber optic cable housing which accomplishes various combinations of the above objects.

These and other objects and advantages of the present invention will no doubt become apparent to those skilled in the art after having read the following description of the embodiments which are contained in and illustrated by the various drawing figures.

Accordingly, a cable duct for protecting communication cable is provided, comprising an elongated body portion having a first end and a second end, the body portion further including a longitudinal axis extending between the first end and the second end; and at least two passageways formed completely through the body portion and extending substantially parallel to the longitudinal axis, each of the passageways having a cross sectional area sufficient to loosely contain at least one communication cable. The cable duct is constructed from a combination of materials including plastic and crumb rubber, preferably in a 1:1 composition, and includes a plurality of external ridges formed perpendicular to the longitudinal axis. The body portion further includes connection means removably attachable to the first end for connecting the cable duct to a second cable duct. With the aforementioned composition of materials, the cable duct can thus be extruded to lengths of at least one kilometer.

DETAILED DESCRIPTION OF THE INVENTION

Figure 1:
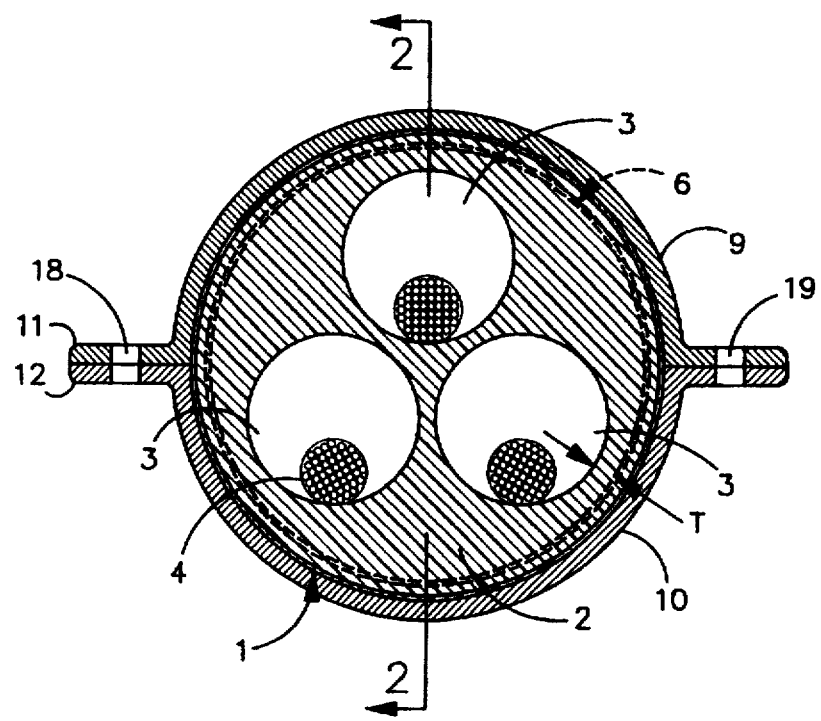
FIG. 1 is an axial sectional view of a preferred embodiment of the invention depicting the passageways formed through the body portion of the cable duct.

In the drawings many details pertaining to fabrication and maintenance utility well-established in the machine construction art and not bearing upon points of novelty are omitted in the interest of descriptive clarity and efficiency.

Figure 2:
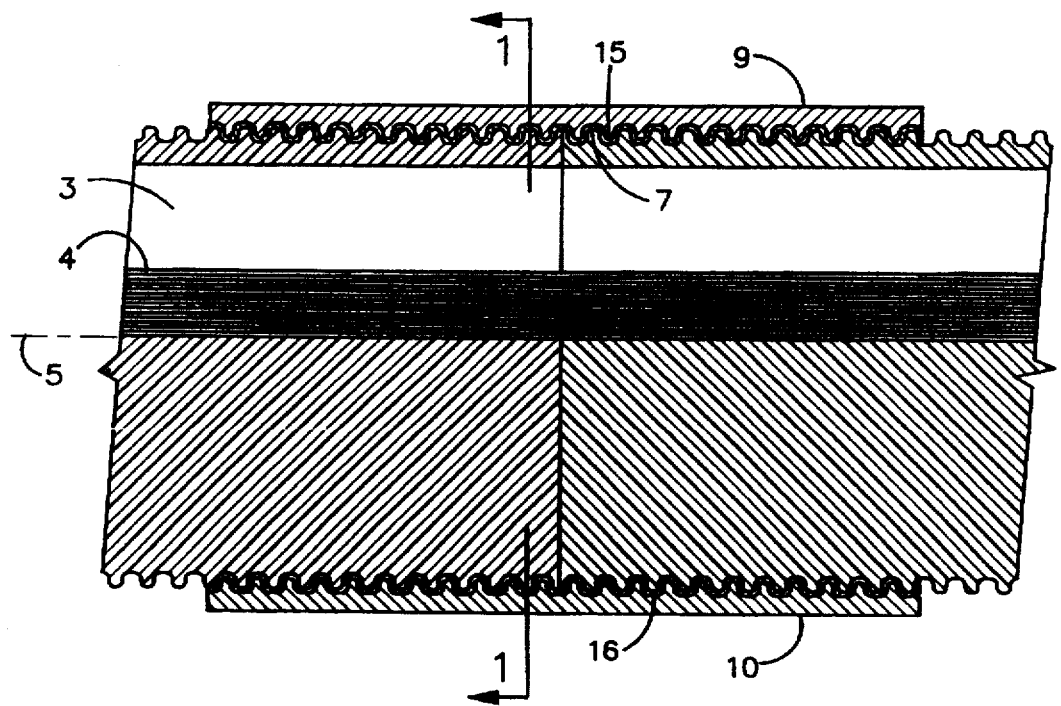
FIG. 2 is a lateral sectional view of two cable ducts of FIG. 1 connected end-to-end depicting the external ridges and cable duct connection means.

Turning now to FIGS. 1 and 2, a preferred embodiment of the cable duct 1 is shown to generally comprise elongated body portion 2, having a longitudinal axis 5, with two or more passageways 3 formed completely through the length of body portion 2. Passageways 3 are preferably formed into body portion 2 in a non-spiraling manner along the length of cable duct 1. Each of passageways 3 is sized to loosely accommodate at least one fiber optic cable 4, the construction of which has been described elsewhere herein. Preferably, the number of passageways 3 and the cross-sectional size of each passageway 3 should be such that a cable duct wall thickness T of at least ⅛ inch is maintained throughout the entire length of cable duct 1. While not intended as a limitation of the invention, the typical dimensions of the preferred embodiment are about 1½ inches in diameter for each passageway 3, with an outer diameter of cable duct 1 of about 4½ inches. Although three passageways 3 are shown in the Figures, it will be understood to those of ordinary skill that any number of passageways 3 may be formed into body portion 2, depending upon the communication requirements of the project. If more passageways 3 are required, the outer diameter of cable duct 1 may be increased accordingly during manufacturing.

Cable duct 1 also includes a corrugated external surface 6, best shown in FIG. 2, which comprises a plurality of ridges 7 encircling body portion 2 in a plane perpendicular to longitudinal axis 5. Ridges 7 are approximately ¼ inch to ½ inch in height and are formed along the entire length of body portion 2 at a pitch of about four ridges per inch. Ridges 7 serve as a means of stabilizing the cable duct 1 in the ground, and they further increase the structural strength of cable duct 1 against forces directed perpendicular to the longitudinal axis 5.

Figure 5:
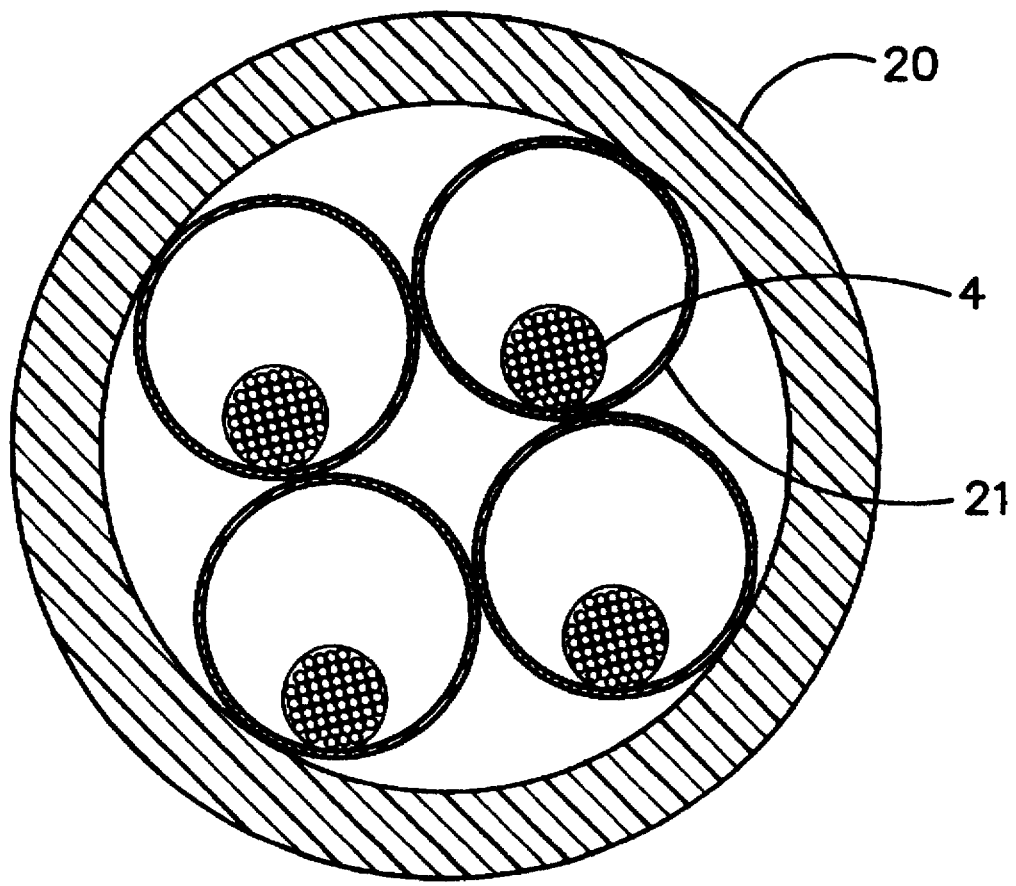
FIG. 5 is an axial sectional view of the prior art apparatus used to contain communication cable.

One key advantage of the foregoing design is that the substantially solid body portion 2 of cable duct 1 results in a stronger duct and affords greater protection to the cables 4. This is contrasted from prior art designs, shown in FIG. 5, in which a uniformly thin outer duct 20 is used to protect the cables 4 and the inner ducts 21.

Figure 3:
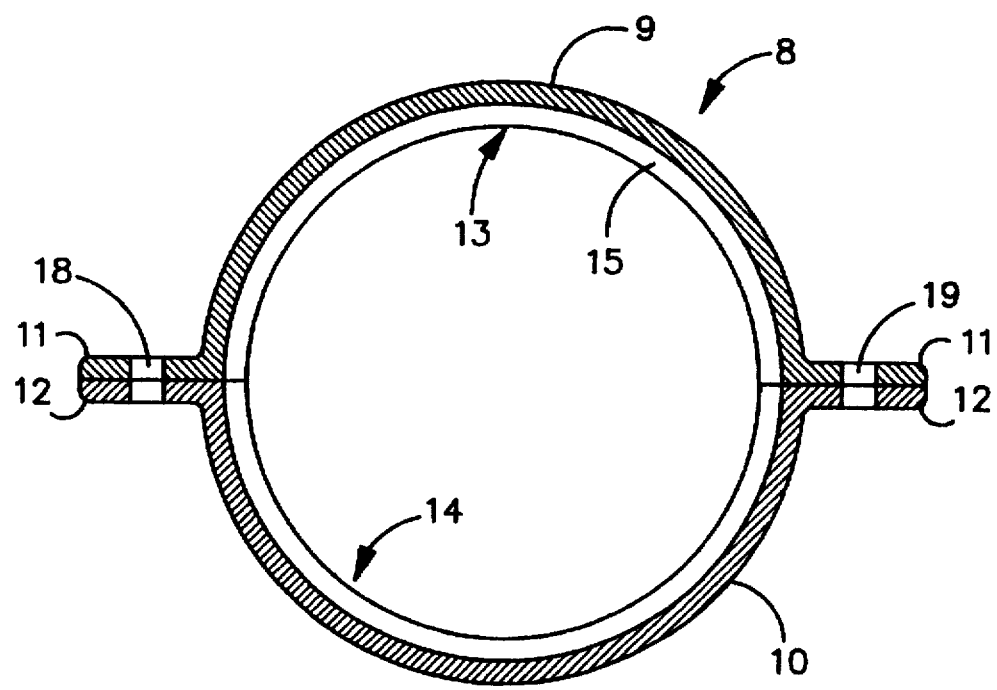
FIG. 3 is a cross-sectional view, taken along Section 1—1, only of the cable duct connection means for attaching multiple sections of cable duct.

Connection means 8 is shown in FIG. 3 for connecting segments of cable duct 1, and comprises an upper section 9 and a lower section 10. Upper and lower sections 9,10 include matching flanges 11,12, respectively, which allow upper and lower sections 9,10 to be securely attached by bolting through holes 18,19 or other means of attachment. Upper section 9 and lower section 10 of connection means 8 include internal surfaces 13,14, respectively, having a plurality of ridges 15. Ridges 15 are formed to identically match ridges 7 on body portion 2. Preferably, a sealant 16 such as silicone is applied between ridges 7 and upper and lower sections 9,10 prior to connecting lengths of cable duct 1 to ensure a leak-proof connection. Upper and lower sections 9,10 are sufficient in length to cover a portion of both connecting cable ducts 1 to provide a secure and substantially rigid connection. While not intended as a limitation, the length of both upper and lower sections 9,10 may typically range from about 8 inches to about 16 inches.

Cable duct 1, as well as upper and lower sections 9,10, are fabricated by extrusion methods well known to those in the art, but are uniquely composed of a combination of roughly 50% "crumb" rubber and 50% plastic. The crumb rubber portion is derived almost entirely from shredded waste tires, and it generally comprises a combination of virgin rubber and synthetic rubber, wherein the synthetic rubber preferably comprises either styrene butyldiene rubber (SBR), ethylene propylene diene monomer (EPDM), or a combination of both. The plastic portion of the cable duct 1 is generally comprised of either polyethylene (used largely in the manufacture of milk jugs), polypropylene (used commonly in the manufacture of shampoo bottles and similar products), or a combination of both. Other types of plastics having similar qualities may also be used. Prior to manufacture of the cable duct 1 and upper and lower sections 9,10, the crumb rubber and the plastic are ground into fine particles ranging in size from a shavings-type to a powder-type consistency. These materials are blended in dry form in roughly 50/50 proportions prior to being heated and liquefied for the extrusion process.

Due to the enhanced flexibility imparted to body portion 2 by the addition of crumb rubber, cable duct 1 can be advantageously extruded in lengths of about 2–12 kilometers, depending upon the modes of data transfer of the cables to be protected. Such flexibility allows the cable duct 1 to be advantageously used with spools in transporting the cable duct 1 and in installing it underground. The primary benefits of achieving these substantially greater lengths are: (1) less connections between cables and cable duct, (2) longer life and greater reliability of the cables, and (3) faster installation and maintenance of both cables and cable duct. Although the preferred ratio of plastics to crumb rubber will typically be 1:1, the precise ratio may be varied depending upon the particular application. For example, if greater rigidity in the cable duct 1 is required, a greater percentage of plastic may be added. Conversely, if greater flexibility is desired, a greater percentage of crumb rubber would likely provide the necessary flexion. Thus, the percentage of crumb rubber in the final composition may possibly range from roughly 10% to 90%, and more preferably between 25% and 75%, with the plastic or other components making up the remainder as desired.

Figure 4:
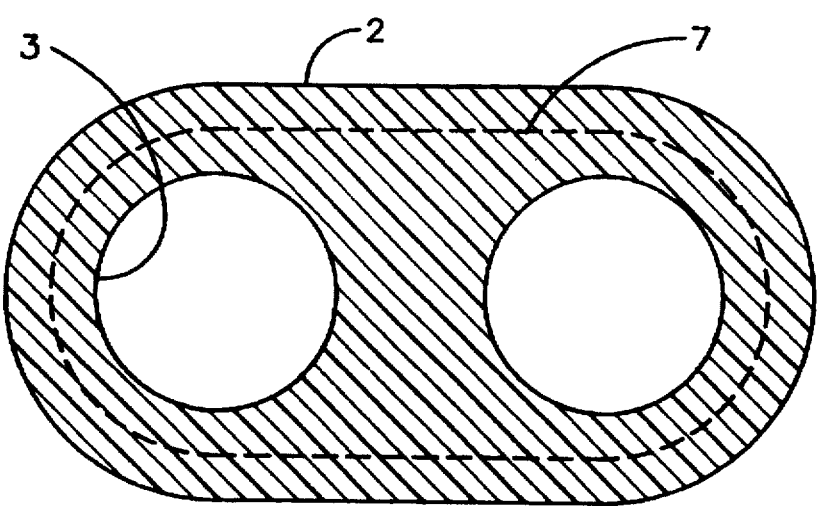
FIG. 4 is an alternative embodiment of the cable duct having a non-round cross section.

Although the preferred embodiment of FIGS. 1–3 depict a round cross-sectional shape, FIG. 4 depicts a non-circular shape which can be employed in the special case of only two passageways 3 or in any other environment where a non-round shape is advantageous. Of course, a wide variety of alternative shapes could be also used, depending upon the number and arrangement of passageways 3 required for a particular cable installation. Similarly, in any non-round configuration of cable duct 1, upper and lower sections 9,10 could be manufactured to have analogous cross-sectional shapes to match the external shape of cable duct 1 as needed to establish a secure and leak-proof connection.

Although the present invention has been described in terms of specific embodiments, it is anticipated that alterations and modifications thereof will no doubt become apparent to those skilled in the art. It is therefore intended that the following claims be interpreted as covering all such alterations and modifications which fall within the true spirit and scope of the invention.

What is claimed is:

1. A cable duct for protecting communication cable, comprising:

(a) an elongated body portion having a first end and a second end, said body portion further including a longitudinal axis extending between said first end and said second end, and a corrugated external surface comprising a plurality of ridges wherein each of said ridges encircles said body portion in a plane substantially perpendicular to said longitudinal axis; and (b) at least two passageways formed completely through said body portion and extending substantially parallel to said longitudinal axis, each of said passageways having a cross sectional area sufficient to loosely contain at least one communication cable;

wherein said body portion is constructed from a combination of materials including plastic and crumb rubber, and wherein said crumb rubber comprises at least 50% of said combination of materials so as to enable said cable duct to be carried on and installed from a spool.

2. The cable duct of claim 1, wherein said body portion further includes connection means removably attachable to said first end of said cable duct for connecting said cable duct to a second cable duct.

3. The cable duct of claim 1, wherein said body portion is fabricated by extrusion to a length of at least one kilometer.

4. The cable duct of claim 1, wherein said body portion includes at least three of said passageways.

5. The cable duct of claim 1, wherein said body portion includes at least five of said passageways.

6. The cable duct of claim 1, wherein said body portion includes a substantially round external cross sectional shape.

* * * * *